US009386493B2

(12) United States Patent
Huang et al.

(10) Patent No.: US 9,386,493 B2
(45) Date of Patent: Jul. 5, 2016

(54) PHYSICAL-LAYER-BASED HANDOVER METHOD, APPARATUS AND SYSTEM

(71) Applicant: Huawei Technologies Co., Ltd., Shenzhen (CN)

(72) Inventors: Ying Huang, Shenzhen (CN); Fan Wang, Stockholm (SE); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/869,764

(22) Filed: Sep. 29, 2015

(65) Prior Publication Data

US 2016/0029267 A1 Jan. 28, 2016

Related U.S. Application Data

(63) Continuation of application No. PCT/CN2013/076848, filed on Jun. 6, 2013.

(30) Foreign Application Priority Data

Mar. 29, 2013 (WO) ................ PCT/CN2013/073495

(51) Int. Cl.
*H04W 36/00* (2009.01)
*H04W 36/04* (2009.01)
(Continued)

(52) U.S. Cl.
CPC ............ *H04W 36/04* (2013.01); *H04W 36/005* (2013.01); *H04W 36/0055* (2013.01); *H04W 36/0083* (2013.01); *H04W 36/30* (2013.01); *H04W 84/04* (2013.01); *H04W 88/02* (2013.01)

(58) Field of Classification Search
None
See application file for complete search history.

(56) References Cited

U.S. PATENT DOCUMENTS 9,094,257 B2 * 7/2015 Morrill ............ H04L 29/06027
2007/0086387 A1 4/2007 Kang et al.
(Continued)

FOREIGN PATENT DOCUMENTS

CN 101014183 A 8/2007
CN 101742553 A 6/2010
(Continued)

OTHER PUBLICATIONS

"HS-SCCH Orders in Four Branch MIMO System," 3GPP TSG-RAN WG1#70, Qingdao, China, R1-123761, 3rd Generation Partnership Project, Valbonne, France (Aug. 13-17, 2012).
(Continued)

*Primary Examiner* — Diane Mizrahi
(74) *Attorney, Agent, or Firm* — Leydig, Voit & Mayer, Ltd.

(57) ABSTRACT

The embodiments of the present invention provide a physical-layer-based handover method. The method includes: generating handover signaling, where the handover signaling carries a signaling type identifier and a destination identifier that are used for handover, and the handover signaling is an HS-SCCH order or specific HS-SCCH signaling; and sending the handover signaling to a physical layer of a mobile terminal, so that the mobile terminal executes handover according to the handover signaling to be handed over to a small cell indicated by the destination identifier. A handover method based on a network side physical layer and a mobile terminal physical layer is provided, and even if cell IDs of a macro cell and a small cell or those of small cells are the same, handover of the mobile terminal can be implemented.

20 Claims, 12 Drawing Sheets

(51) Int. Cl.
*H04W 36/30* (2009.01)
*H04W 88/02* (2009.01)
*H04W 84/04* (2009.01)

(56) References Cited

U.S. PATENT DOCUMENTS

2010/0172319 A1 7/2010 Shimobayashi
2011/0223917 A1 9/2011 Gao et al.

FOREIGN PATENT DOCUMENTS

| CN | 101754265 A | 6/2010 |
| CN | 101877895 A | 11/2010 |
| CN | 102238671 A | 11/2011 |
| EP | 1641298 A1 | 3/2006 |
| WO | WO 2010051782 A1 | 5/2010 |

OTHER PUBLICATIONS

"3$^{rd}$ Generation Partnership Project; Technical Specification Group Radio Access Network; Multiplexing and channel coding (FDD) (Release 10)," 3GPP TS 25.212, V10.4.0, pp. 1-116, 3$^{rd}$ Generation Partnership Project, Valbonne, France (Dec. 2012).

Baker, "LTE-Advanced Physical Layer," IMT-Advanced Evaluation Workshop, REV-090003r1, pp. 1-48, 3$^{rd}$ Generation Partnership Project, Valbonne, France (Dec. 17-18, 2009).

* cited by examiner

PHYSICAL-LAYER-BASED HANDOVER METHOD, APPARATUS AND SYSTEM

CROSS-REFERENCE TO RELATED APPLICATIONS

This application is a continuation of International Patent Application No. PCT/CN2013/076848, filed on Jun. 6, 2013, which claims priority to International Patent Application No. PCT/CN2013/073495, filed on Mar. 29, 2013, both of which are hereby incorporated by reference in their entireties.

TECHNICAL FIELD

The present invention relates to the field of wireless communications technologies, and in particular, to a physical-layer-based handover method, apparatus and system.

BACKGROUND

In a wireless communications system, a base station is a radio station that implements information transfer between a mobile terminal and a mobile switching center. An area covered by wireless services that can be provided by a base station is usually referred to as a cell. A mobile terminal in a cell performs information transfer with a mobile switching center by using a base station that serves the cell.

With rapid development of communications technologies, more people begin to carry out instant messaging by using a mobile terminal, so as to meet the need of rapid development of the current society. A base station is used as a macro base station, and a cell covered by wireless services that are provided by the macro base station is used as a macro cell. To increase throughput of the macro cell, multiple small-cell base stations may be deployed in the macro cell covered by the macro base station, and an area covered by wireless services that are provided by each small-cell base station is a small cell.

At present, there are many network deployment manners for deploying small cells in the macro cell to increase the throughput of the macro cell. In one of the network deployment manners, primary pilots and cell identifiers (ID) of the macro cell and the small cells are the same. However, in the foregoing network deployment manner, very strong interference is generated by primary pilot signals, control signals and data signals sent between the macro cell and a small cell and between small cells, so that a mobile terminal cannot receive signals normally. To reduce the interference of signals sent between the macro cell and a small cell or between small cells, different primary pilot spreading codes are set for cells that use a same cell identifier ID, or one or more other auxiliary pilots are added, so that the mobile terminal can receive information normally.

However, when the mobile terminal moves from one small cell to another small cell, because primary pilot spreading codes of the two small cells are different or one or more other auxiliary pilots are added, the mobile terminal needs to be handed over from the previous small cell to the current small cell. At present, there is no handover method that can implement handover of the mobile terminal between the macro cell and a small cell or between small cells that have a same cell ID.

SUMMARY

In view of this, embodiments of the present invention provide a physical-layer-based handover method, apparatus and system, so as to solve the issue of handover of a mobile terminal between a macro cell and a small cell that have a same cell ID or between small cells that have a same cell ID.

According to a first aspect of the embodiments of the present invention, a physical-layer-based handover method is provided, which is applied to a network side physical layer, and the method includes:

generating handover signaling, where the handover signaling carries a signaling type identifier and a destination identifier that are used for handover, and the handover signaling is an HS-SCCH order or specific HS-SCCH signaling; and sending the handover signaling to a physical layer of a mobile terminal, so that the mobile terminal executes handover according to the handover signaling.

In a first possible implementation manner of the first aspect of the embodiments of the present invention, when the handover signaling is an HS-SCCH order, the generating handover signaling includes:

writing the signaling type identifier and the destination identifier that are used for handover into a combination of any one or more of an extended order type, an order type and an order field in the HS-SCCH order, so as to generate the handover signaling.

In a second possible implementation manner of the first aspect of the embodiments of the present invention, when the handover signaling is specific HS-SCCH signaling, the generating handover signaling includes:

generating first HS-SCCH signaling, where the first HS-SCCH signaling carries the destination identifier; and scrambling the first HS-SCCH signaling by using a preset scrambling code or spreading spectrum of the first HS-SCCH signaling by using a preset spreading code, so as to generate the handover signaling.

With reference to the second possible implementation manner of the first aspect of the embodiments of the present invention, in a third possible implementation manner, the generating first HS-SCCH signaling includes:

writing the destination identifier into a transport block and/or a redundancy field in an information element of an HS-SCCH channel, so as to generate the first HS-SCCH signaling;

or, writing the destination identifier into a writing special information type and/or special information in an information element of an HS-SCCH channel, so as to generate the first HS-SCCH signaling.

With reference to the second possible implementation manner of the first aspect of the embodiments of the present invention, in a fourth possible implementation manner, the preset scrambling code or spreading code is:

a scrambling code or spreading code that is sent to the physical layer of the mobile terminal by using a system broadcast or RRC message before handover of the mobile terminal;

or, a fixed scrambling code or spreading code agreed on in advance with the mobile terminal.

In a fifth possible implementation manner of the first aspect of the embodiments of the present invention, when the handover signaling is specific HS-SCCH signaling, the generating handover signaling includes:

writing the signaling type identifier and the destination identifier into a transport block and/or a redundancy field in an information element of an HS-SCCH channel, so as to generate the handover signaling;

or, writing the signaling type identifier and the destination identifier into a special information type and/or special information in an information element of an HS-SCCH channel, so as to generate the handover signaling.

With reference to the first aspect of the embodiments of the present invention to the fifth possible implementation manner of the first aspect, in a sixth possible implementation manner, the destination identifier includes:

at least one of a pilot spreading code, a transmit port number, an index corresponding to the pilot spreading code, and a scrambling code.

With reference to the sixth possible implementation manner of the first aspect of the embodiments of the present invention, in a seventh possible implementation manner, the pilot spreading code includes:

a primary pilot spreading code or an auxiliary pilot spreading code.

With reference to the first aspect of the embodiments of the present invention to the fifth possible implementation manner of the first aspect, in an eighth possible implementation manner, the method further includes:

receiving a communication quality parameter sent by the physical layer of the mobile terminal, and generating the handover signaling by using the communication quality parameter.

With reference to the eighth possible implementation manner of the first aspect of the embodiments of the present invention, in a ninth possible implementation manner, the communication quality parameter includes:

at least one of signal quality, received signal code power, a signal-to-noise ratio, a received signal strength indicator, and a channel quality indicator.

With reference to the eighth possible implementation manner of the first aspect of the embodiments of the present invention, in a tenth possible implementation manner, the communication quality parameter includes:

at least one of a pilot spreading code, a transmit port number, and an index corresponding to the pilot spreading code.

With reference to the first aspect of the embodiments of the present invention to the tenth possible implementation manner of the first aspect, in an eleventh possible implementation manner, the method further includes:

sending a first handover indication of the mobile terminal to a first media access control layer, where the first handover indication is used for reporting handover of the mobile terminal.

With reference to the eleventh possible implementation manner of the first aspect of the embodiments of the present invention, in a twelfth possible implementation manner, the method further includes:

sending the first handover indication of the mobile terminal to a first radio resource control layer by using the first media access control layer.

With reference to the first aspect of the embodiments of the present invention to the twelfth possible implementation manner of the first aspect, in a thirteenth possible implementation manner, the method further includes:

receiving handover completion response information sent by the physical layer of the mobile terminal.

According to a second aspect of the embodiments of the present invention, a physical-layer-based handover method is provided, which is applied to a mobile terminal physical layer, and the method includes:

receiving handover signaling delivered by a network side physical layer, where the handover signaling carries a signaling type identifier and a destination identifier that are used for handover, and the handover signaling is an HS-SCCH order or specific HS-SCCH signaling; and executing handover according to the handover signaling.

In a first possible implementation manner of the second aspect of the embodiments of the present invention, when the handover signaling is an HS-SCCH order, the executing handover according to the handover signaling includes:

parsing a handover order generated from a combination of any one or more of an extended order type, an order type and an order field in the HS-SCCH order to obtain the signaling type identifier and the destination identifier that are used for handover, and executing handover.

In a second possible implementation manner of the second aspect of the embodiments of the present invention, when the handover signaling is specific HS-SCCH signaling, the executing handover according to the handover signaling includes:

decoding the handover signaling by using a preset scrambling code or decoding the handover signaling by using a preset spreading code to obtain first HS-SCCH signaling, where the first HS-SCCH signaling carries the destination identifier; and parsing the first HS-SCCH signaling to obtain the destination identifier, and executing handover.

With reference to the second possible implementation manner of the second aspect of the embodiments of the present invention, in a third possible implementation manner, the parsing the first HS-SCCH signaling to obtain the destination identifier, and executing handover includes:

parsing a transport block and/or a redundancy field in the first HS-SCCH signaling to obtain the destination identifier, and executing handover;

or, parsing a special information type and/or special information in the first HS-SCCH signaling to obtain the destination identifier, and executing handover.

With reference to the second possible implementation manner of the second aspect of the embodiments of the present invention, in a fourth possible implementation manner, the preset scrambling code or spreading code is:

a received scrambling code or spreading code that is sent by the network side by using a system broadcast or RRC message before handover;

or, a fixed scrambling code or spreading code agreed on in advance with the network side.

In a fifth possible implementation manner of the second aspect of the embodiments of the present invention, when the handover signaling is specific HS-SCCH signaling, the executing handover according to the handover signaling includes:

parsing a transport block and/or a redundancy field in the handover signaling to obtain the signaling type identifier and the destination identifier, and executing handover;

or, parsing a special information type and/or special information in the handover signaling to obtain the signaling type identifier and the destination identifier, and executing handover.

With reference to the second aspect of the embodiments of the present invention to the fifth possible implementation manner of the second aspect, in a sixth possible implementation manner, the destination identifier includes:

at least one of a pilot spreading code, a transmit port number, an index corresponding to the pilot spreading code, and a scrambling code.

With reference to the second aspect of the embodiments of the present invention to the fifth possible implementation manner of the second aspect, in a seventh possible implementation manner, the method further includes:

sending a communication quality parameter to the network side physical layer, so that the network side physical layer generates the handover signaling by using the communication quality parameter.

With reference to the seventh possible implementation manner of the second aspect of the embodiments of the present invention, in an eighth possible implementation manner, the communication quality parameter includes:

at least one of signal quality, received signal code power, a signal-to-noise ratio, a received signal strength indicator, and a channel quality indicator.

With reference to the seventh possible implementation manner of the second aspect of the embodiments of the present invention, in a ninth possible implementation manner, the communication quality parameter includes:

at least one of a pilot spreading code, a transmit port number, and an index corresponding to the pilot spreading code.

With reference to the second aspect of the embodiments of the present invention to the ninth possible implementation manner of the second aspect, in a tenth possible implementation manner, the method further includes:

sending a second handover indication to a second media access control layer, where the second handover indication is used for reporting the handover.

With reference to the tenth possible implementation manner of the second aspect of the embodiments of the present invention, in an eleventh possible implementation manner, the method further includes:

sending the second handover indication to a second radio resource control layer by using the second media access control layer.

With reference to the second aspect of the embodiments of the present invention to the eleventh possible implementation manner of the second aspect, in a twelfth possible implementation manner, the method further includes:

sending handover completion response information to the network side physical layer.

According to a third aspect of the embodiments of the present invention, a handover apparatus for a network side physical layer is provided, and the apparatus includes:

a signaling generating module, configured to generate handover signaling, where the handover signaling carries a signaling type identifier and a destination identifier that are used for handover, and the handover signaling is an HS-SCCH order or specific HS-SCCH signaling; and a first sending module, configured to send the handover signaling to a physical layer of a mobile terminal, so that the mobile terminal executes handover according to the handover signaling.

In a first possible implementation manner of the third aspect of the embodiments of the present invention, when the handover signaling is an HS-SCCH order, the signaling generating module includes:

a first signaling generating unit, configured to write the signaling type identifier and the destination identifier that are used for handover into a combination of any one or more of an extended order type, an order type and an order field in the HS-SCCH order, so as to generate the handover signaling.

In a second possible implementation manner of the third aspect of the embodiments of the present invention, when the handover signaling is specific HS-SCCH signaling, the signaling generating module includes:

a second signaling generating unit, configured to generate first HS-SCCH signaling, where the first HS-SCCH signaling carries the destination identifier; and a third signaling generating unit, configured to scramble the first HS-SCCH signaling by using a preset scrambling code or spread spectrum of the first HS-SCCH signaling by using a preset spreading code, so as to generate the handover signaling.

With reference to the second possible implementation manner of the third aspect of the embodiments of the present invention, in a third possible implementation manner, the second signaling generating unit includes:

a first writing subunit, configured to write the destination identifier into a transport block and/or a redundancy field in an information element of an HS-SCCH channel, so as to generate the first HS-SCCH signaling;

or, a second writing subunit, configured to write the destination identifier into a writing special information type and/or special information in an information element of an HS-SCCH channel, so as to generate the first HS-SCCH signaling.

With reference to the second possible implementation manner of the third aspect of the embodiments of the present invention, in a fourth possible implementation manner, the preset scrambling code or spreading code is:

a scrambling code or spreading code that is sent to the physical layer of the mobile terminal by using a system broadcast or RRC message before handover of the mobile terminal;

or, a fixed scrambling code or spreading code agreed on in advance with the mobile terminal.

In a fifth possible implementation manner of the third aspect of the embodiments of the present invention, when the handover signaling is specific HS-SCCH signaling, the signaling generating module includes:

a fourth signaling generating unit, configured to write the signaling type identifier and the destination identifier into a transport block and/or a redundancy field in an information element of an HS-SCCH channel, so as to generate the handover signaling;

or, configured to write the signaling type identifier and the destination identifier into a special information type and/or special information in an information element of an HS-SCCH channel, so as to generate the handover signaling.

With reference to the third aspect of the embodiments of the present invention to the fifth possible implementation manner of the third aspect, in a sixth possible implementation manner, the destination identifier includes:

at least one of a pilot spreading code, a transmit port number, an index corresponding to the pilot spreading code, and a scrambling code.

With reference to the third aspect of the embodiments of the present invention to the fifth possible implementation manner of the third aspect, in a seventh possible implementation manner, the apparatus further includes:

a first receiving module, configured to receive a communication quality parameter sent by the physical layer of the mobile terminal, and generate the handover signaling by using the communication quality parameter.

With reference to the seventh possible implementation manner of the third aspect of the embodiments of the present invention, in an eighth possible implementation manner, the communication quality parameter includes:

at least one of signal quality, received signal code power, a signal-to-noise ratio, a received signal strength indicator, and a channel quality indicator.

With reference to the third aspect of the embodiments of the present invention to the eighth possible implementation manner of the third aspect, in a ninth possible implementation manner, the apparatus further includes:

a first indication module, configured to send a first handover indication of the mobile terminal to a first media access control layer, where the first handover indication is used for reporting handover of the mobile terminal.

With reference to the ninth possible implementation manner of the third aspect of the embodiments of the present invention, in a tenth possible implementation manner, the apparatus further includes:

a second indication module, configured to send the first handover indication of the mobile terminal to a first radio resource control layer by using the first media access control layer.

With reference to the third aspect of the embodiments of the present invention to the tenth possible implementation manner of the third aspect, in an eleventh possible implementation manner, the apparatus further includes:

a second receiving module, configured to receive handover completion response information sent by the physical layer of the mobile terminal.

According to a fourth aspect of the embodiments of the present invention, a handover apparatus for a mobile terminal physical layer is provided, and the apparatus includes:

a third receiving module, configured to receive handover signaling delivered by a network side physical layer, where the handover signaling carries a signaling type identifier and a destination identifier that are used for handover, and the handover signaling is an HS-SCCH order or specific HS-SCCH signaling; and a handover execution module, configured to execute handover according to the handover signaling.

In a first possible implementation manner of the fourth aspect of the embodiments of the present invention, when the handover signaling is an HS-SCCH order, the handover execution module includes:

a first handover execution unit, configured to parse a handover order generated from a combination of any one or more of an extended order type, an order type and an order field in the HS-SCCH order to obtain the signaling type identifier and the destination identifier that are used for handover, and execute handover.

In a second possible implementation manner of the fourth aspect of the embodiments of the present invention, when the handover signaling is specific HS-SCCH signaling, the handover execution module includes:

a first decoding unit, configured to decode the handover signaling by using a preset scrambling code or decode the handover signaling by using a preset spreading code to obtain first HS-SCCH signaling, where the first HS-SCCH signaling carries the destination identifier; and a second handover execution unit, configured to parse the first HS-SCCH signaling to obtain the destination identifier, and execute handover.

With reference to the second possible implementation manner of the fourth aspect of the embodiments of the present invention, in a third possible implementation manner, the second handover execution unit includes:

a first handover execution subunit, configured to parse a transport block and/or a redundancy field in the first HS-SCCH signaling to obtain the destination identifier, and execute handover;

or, a second handover execution subunit, configured to parse a special information type and/or special information in the first HS-SCCH signaling to obtain the destination identifier, and execute handover.

With reference to the second possible implementation manner of the fourth aspect of the embodiments of the present invention, in a fourth possible implementation manner, the preset scrambling code or spreading code is:

a received scrambling code or spreading code that is sent by the network side by using a system broadcast or RRC message before handover;

or, a fixed scrambling code or spreading code agreed on in advance with the network side.

In a fifth possible implementation manner of the fourth aspect of the embodiments of the present invention, when the handover signaling is specific HS-SCCH signaling, the handover execution module includes:

a third handover execution unit, configured to parse a transport block and/or a redundancy field in the handover signaling to obtain the signaling type identifier and the destination identifier, and execute handover;

or, configured to parse a special information type and/or special information in the handover signaling to obtain the signaling type identifier and the destination identifier, and execute handover.

With reference to the fourth aspect of the embodiments of the present invention to the fifth possible implementation manner of the fourth aspect, in a sixth possible implementation manner, the destination identifier includes:

at least one of a pilot spreading code, a transmit port number, an index corresponding to the pilot spreading code, and a scrambling code.

With reference to the fourth aspect of the embodiments of the present invention to the fifth possible implementation manner of the fourth aspect, in a seventh possible implementation manner, the apparatus further includes:

a second sending module, configured to send a communication quality parameter to the network side physical layer, so that the network side physical layer generates the handover signaling by using the communication quality parameter.

With reference to the seventh possible implementation manner of the fourth aspect of the embodiments of the present invention, in an eighth possible implementation manner, the communication quality parameter includes:

at least one of signal quality, received signal code power, a signal-to-noise ratio, a received signal strength indicator, and a channel quality indicator.

With reference to the fourth aspect of the embodiments of the present invention to the eighth possible implementation manner of the fourth aspect, in a ninth possible implementation manner, the apparatus further includes:

a third indication module, configured to send a second handover indication to a second media access control layer, where the second handover indication is used for reporting the handover.

With reference to the ninth possible implementation manner of the fourth aspect of the embodiments of the present invention, in a tenth possible implementation manner, the apparatus further includes:

a fourth indication module, configured to send the second handover indication to a second radio resource control layer by using the second media access control layer.

With reference to the fourth aspect of the embodiments of the present invention to the tenth possible implementation manner of the fourth aspect, in an eleventh possible implementation manner, the apparatus further includes:

a third sending module, configured to send handover completion response information to the network side physical layer.

According to a fifth aspect of the embodiments of the present invention, a handover system is provided, and the system includes:

the handover apparatus for a network side physical layer provided by the third aspect of the embodiments of the present invention to the eleventh possible implementation manner of the third aspect, and the handover apparatus for a mobile terminal physical layer provided by the fourth aspect of the embodiments of the present invention to the eleventh possible implementation manner of the fourth aspect.

It can be known from the above content that the present invention has the following beneficial effects:

The embodiments of the present invention provide a physical-layer-based handover method, apparatus and system, where the method includes: generating handover signaling, where the handover signaling carries a signaling type identifier and a destination identifier that are used for handover, and the handover signaling is an HS-SCCH order or specific HS-SCCH signaling; and sending the handover signaling to a physical layer of a mobile terminal, so that the mobile terminal executes handover according to the handover signaling to be handed over to a small cell indicated by the destination identifier; and a handover method based on a network side physical layer and a mobile terminal physical layer is provided, and even if cell IDs of a macro cell and a small cell or those of small cells are the same, handover of the mobile terminal can still be implemented.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

In order to provide a solution for implementing handover of a mobile terminal between a macro cell and a small cell that have a same cell ID or between small cells that have a same cell ID, embodiments of the present invention provide a physical-layer-based handover method and apparatus. The following describes the exemplary embodiments of the present invention with reference to the accompanying drawings of the specification. It should be understood that the exemplary embodiments described herein are merely used to describe and explain the present invention, but are not intended to limit the present invention. In a case of no conflict, the embodiments in this application and features in the embodiments may be combined.

Detailed descriptions are given below with reference to the accompanying drawings.

Embodiment 1

Figure 1:
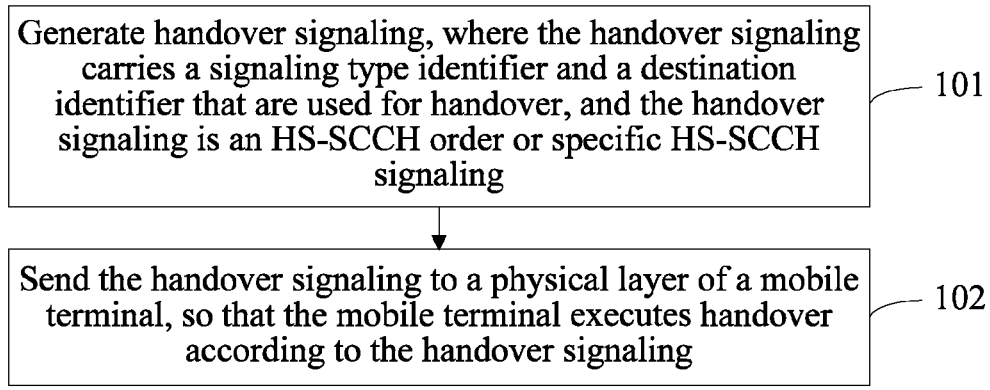
FIG. 1 is a flowchart of Embodiment 1 of a physical-layer-based handover method according to the present invention.

FIG. 1 is a flowchart of Embodiment 1 of a physical-layer-based handover method according to the present invention. The method provided in Embodiment 1 is applied to a network side physical layer, and includes the following steps:

Step 101: Generate handover signaling, where the handover signaling carries a signaling type identifier and a destination identifier that are used for handover, and the handover signaling is an HS-SCCH order or specific HS-SCCH signaling.

The signaling type identifier is used to identify that received signaling is handover signaling and used for handover execution. The signaling type identifier may be a specific date string, or may be a signaling type identifier obtained by scrambling with a preset scrambling code or by spreading spectrum with a spreading code.

The destination identifier includes: at least one of a pilot spreading code, a transmit port number, an index corresponding to the pilot spreading code, and a scrambling code. A pilot spreading code, an index, a transmit port number and a scrambling code vary with each small cell, and therefore, the destination identifier can identify a small cell to which a mobile terminal needs to be handed over. Because the pilot spreading code is relatively long, normally an index corresponding to the transmit port number or the pilot spreading code may be used as a handover identifier. The pilot herein may be a primary pilot or an auxiliary pilot. If the primary pilot is used for distinguishing, spreading codes of a primary pilot at a destination side and a primary pilot at a source side are different, which are used for distinguishing different cells. If the auxiliary pilot is used, spreading codes of a primary pilot at a destination side and a primary pilot at a source side are the same, and spreading codes or scrambling codes of auxiliary pilots are different, which are used for distinguishing different cells.

The handover signaling is an HS-SCCH order or specific HS-SCCH (high-speed shared control channel) signaling.

Step 102: Send the handover signaling to a physical layer of a mobile terminal, so that the mobile terminal executes handover according to the handover signaling.

After the network side physical layer sends the handover signaling to the physical layer of the mobile terminal, the physical layer of the mobile terminal identifies the received signaling according to the signaling type identifier in the handover signaling, so as to execute handover to be handed over to a small cell indicated by the destination identifier carried in the handover signaling.

The network side physical layer may be a physical layer of a central control node (Base band Unit, BBU) in a macro cell or small cell. Optionally, a communication quality measurement parameter is included in a measurement report sent by the mobile terminal.

It can be known from the above content that the present invention has the following beneficial effects:

This embodiment the present invention provides a physical-layer-based handover method, apparatus and system, where the method includes: generating handover signaling, where the handover signaling carries a signaling type identifier and a destination identifier that are used for handover, and the handover signaling is an HS-SCCH order or specific HS-SCCH signaling; and sending the handover signaling to a physical layer of a mobile terminal, so that the mobile terminal executes handover according to the handover signaling to be handed over to a small cell indicated by the destination identifier; and a handover method based on a network side physical layer and a mobile terminal physical layer is provided, and even if cell IDs of a macro cell and a small cell or those of small cells are the same, handover of the mobile terminal can be implemented.

Embodiment 2

Figure 2:
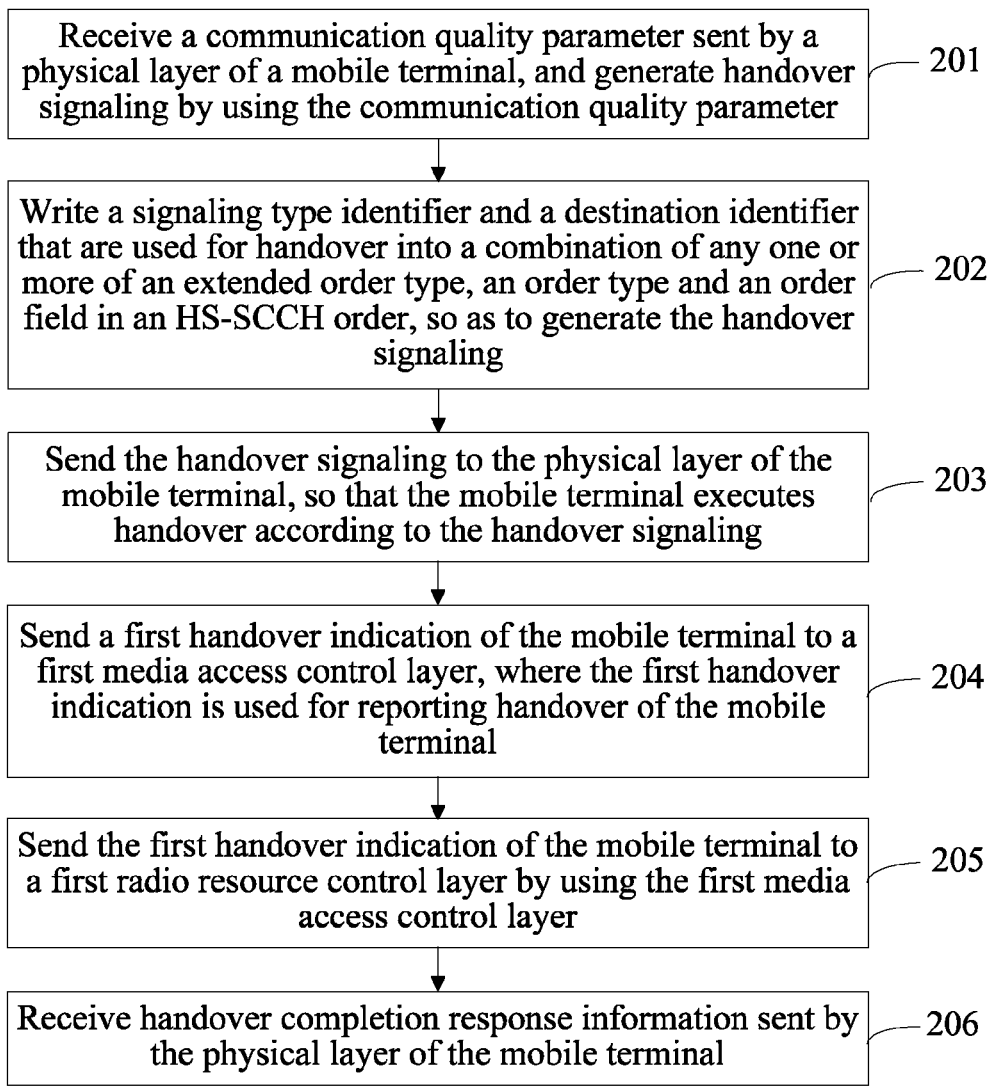
FIG. 2 is a flowchart of Embodiment 2 of a physical-layer-based handover method according to the present invention.

FIG. 2 is a flowchart of Embodiment 2 of a physical-layer-based handover method according to the present invention. Embodiment 2 is applied to a network side physical layer, and in a specific implementation manner, generated handover signaling is an HS-SCCH order. The method includes:

Step 201: Receive a communication quality parameter sent by a physical layer of a mobile terminal, and generate handover signaling by using the communication quality parameter.

The physical layer of the mobile terminal detects in real time a current communication quality parameter of the mobile terminal, where the communication quality parameter includes: signal quality, received signal code power (RSCP), a signal-to-noise ratio (Ec/N0), a received signal strength indicator (RSSI), a channel quality indicator (CQI), and/or the like, and the physical layer of the mobile terminal sends the communication quality parameter to the network side physical layer. Optionally, the communication quality parameter may also include at least one of a pilot spreading code, a transmit port number, and an index corresponding to the pilot spreading code.

When the mobile terminal is moving from one small cell to another small cell, the communication quality between the mobile terminal and the current serving small cell declines gradually, the signal quality declines gradually, and a value of the CQI declines; and the communication quality between the mobile terminal and the another small cell increases gradually, the signal quality increases gradually, and a value of the CQI increases. The network side physical layer determines a destination identifier of the mobile terminal by using the communication quality parameter.

Step 202: Write a signaling type identifier and a destination identifier that are used for handover into a combination of any one or more of an extended order type, an order type and an order field in an HS-SCCH order, so as to generate the handover signaling.

The handover signaling carries two parts, namely the signaling type identifier and the destination identifier. The signaling type identifier is used to identify that received signaling is handover signaling and used for handover execution; and the destination identifier is used to indicate a small cell to hand over to.

At present, a format of the HS-SCCH order is:

an extended order type (Extended order type, 2 bits): xeodt,1, xeodt,2;

an order type (Order type, 3 bits): xodt,1, xodt,2, xodt,3;

an order field (Order, 3 bit): xord,1, xord,2, xord,3;

a user equipment identity (UE identity, 16 bits): xue,1, xue,2, . . . , xue,16.

The handover order is generated from a combination of any one or more of an extended order type, an order type and an order field. That is, the signaling type identifier may be written into 2 bits of the extended order type, or 3 bits of the order type, or 3 bits of the order field; the signaling type identifier may also be written into a combination of 1 bit selected from the extended order type, 1 bit selected from the order type and 1 bit selected from the order field; and there may also be other combination forms, which are not described herein one by one.

For example, the handover order is set as follows:

xeodt,1, xeodt,2='11', xodt,1, xodt,2, xodt,3='111', and xord,1, xord,2, xord,3=port number code or index, where a combination "11111" of the extended order type and the order type is used as the signaling type identifier, which indicates that the received signaling is handover signaling; and a port number code or index corresponding to "xord,1, xord,2, xord, 3" is used as the destination identifier carried in the handover signaling, which indicates a small cell to which the mobile terminal needs to be handed over. When receiving the handover signaling and reading the signaling type identifier, the mobile terminal can know that the currently received signaling is handover signaling, and the mobile terminal is handed over to the small cell indicated by the destination identifier according to the destination identifier carried in the handover signaling.

Setting of the handover signaling is not limited to the foregoing specific example, and there may also be many setting manners. Data bits occupied by the signaling type identifier in the handover signaling are not limited, occupied data bits of the extended order type, order type and order field are not limited either. For example, 1 data bit of the extended order type may be occupied, or no data bit of the extended order type is occupied, as long as the signaling type identifier is written into a combination of any one or more of the extended order type, order type and order field. A setting manner of the destination identifier is the same as that of the signaling type identifier, and no further details are provided herein.

Use of the UE identity in the HS-SCCH order still applies and no change is needed.

Locations of the extended order type, order type and order in the HS-SCCH order are not limited, and may be set specifically according to original signaling sequence in the HS-SCCH order, so as to ensure universality of the handover signaling.

Step 203: Send the handover signaling to the physical layer of the mobile terminal, so that the mobile terminal executes handover according to the handover signaling.

Step 204: Send a first handover indication of the mobile terminal to a first media access control layer, where the first handover indication is used for reporting handover of the mobile terminal.

The network side physical layer sends the first handover indication of the mobile terminal to the first media access control layer. The first media access control layer is a network side media access control (MAC) layer. The first handover indication may include the destination identifier and is used for reporting handover of the mobile terminal, so that the network side MAC records the small cell to which the mobile terminal is handed over. When there is data needed to be sent to the mobile terminal, the data is delivered to the mobile terminal by using a small-cell base station of the small cell.

Step 205: Send the first handover indication of the mobile terminal to a first radio resource control layer by using the first media access control layer.

The first radio resource control layer is a network side radio resource control layer (Radio Resource Control, RRC). The network side physical layer may also report the first handover indication of the mobile terminal to the network side RRC by using the network side MAC, so that the network side RRC performs resource management.

Step 206: Receive handover completion response information sent by the physical layer of the mobile terminal.

After handover from the current serving small cell to the small cell indicated by the destination identifier, the mobile terminal gives the handover completion response information to the network side physical layer to notify the network side physical layer of handover completion.

Step 204, step 205 and step 206 are optional execution steps, and do not affect implementation of handover, and step 204 and step 205 may be performed before step 203, or may be performed after step 206.

Embodiment 3

Figure 3:
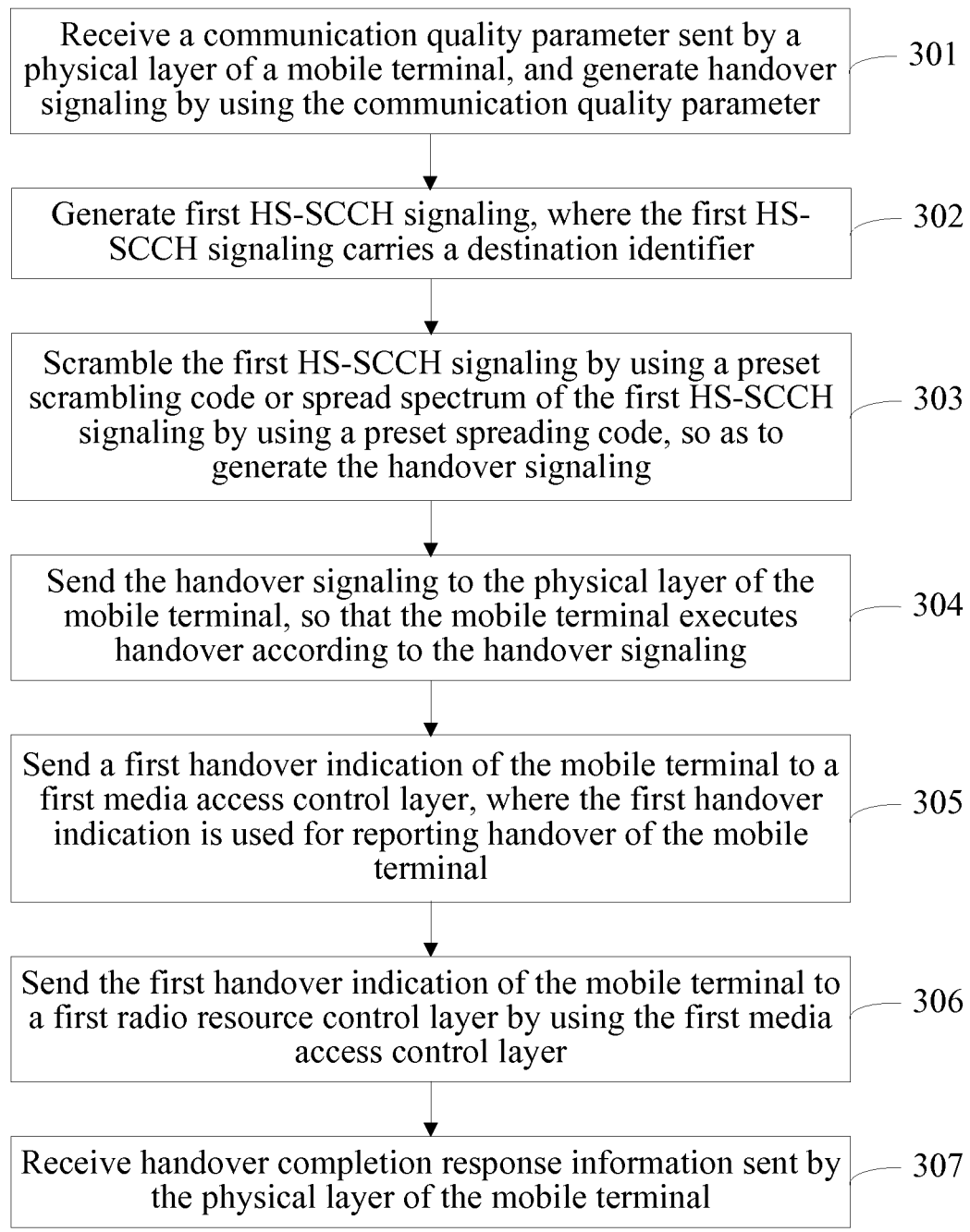
FIG. 3 is a flowchart of Embodiment 3 of a physical-layer-based handover method according to the present invention.

FIG. 3 is a flowchart of Embodiment 3 of a physical-layer-based handover method according to the present invention. Embodiment 3 is applied to a network side physical layer, and in a specific implementation manner, generated handover signaling is HS-SCCH signaling. The method includes:

Step 301: Receive a communication quality parameter sent by a physical layer of a mobile terminal, and generate handover signaling by using the communication quality parameter.

This part is similar to Embodiment 2, and no further details are provided herein.

Step 302: Generate first HS-SCCH signaling, where the first HS-SCCH signaling carries a destination identifier.

The HS-SCCH signaling has two formation manners, and therefore there are two implementation manners for generating the first HS-SCCH signaling.

A first implementation manner is: writing the destination identifier into a transport block and/or a redundancy field in an information element of an HS-SCCH channel, so as to generate the first HS-SCCH signaling.

In this case, formation of the HS-SCCH signaling includes at least:

a spreading code (Channelization-code information), a transport block (Transport-block size information, TBS), a redundancy field (Redundancy and constellation version, RV), and a UE radio network temporary identity (UE identity RNTI (Radio Network Temporary Identity)).

The destination identifier is written into the transport block and/or redundancy field of the HS-SCCH signaling.

A second implementation manner is: writing the destination identifier into a writing special information type and/or special information in an information element of an HS-SCCH channel, so as to generate the first HS-SCCH signaling.

In this case, formation of the HS-SCCH signaling includes at least:

a spreading code (Channelization-code information), a special information type (Special Information type, 6 bits): xtype,1, xtype,2, . . . , xtype,6, special information (Special Information, 7 bits): xinfo,1, xinfo,2, xinfo,3, xinfo,4, xinfo,5, xinfo,6, xinfo,7, and a mobile terminal radio network temporary identity (UE identity RNTI (Radio Network Temporary Identity)).

The destination identifier is written into the special information type and/or special information of the HS-SCCH signaling.

Step 303: Scramble the first HS-SCCH signaling by using a preset scrambling code or spread spectrum of the first HS-SCCH signaling by using a preset spreading code, so as to generate the handover signaling.

The scrambling code or spreading code is:

a scrambling code or spreading code that is sent to the physical layer of the mobile terminal by using a system broadcast or RRC message before handover of the mobile terminal; or, a fixed scrambling code or spreading code agreed on in advance with the mobile terminal.

A signaling type identifier is obtained by scrambling with the scrambling code or by spreading spectrum with the spreading code, and is used to identify that received signaling is handover signaling. When receiving the signaling of the HS-SCCH channel, the mobile terminal decodes the received signaling by using the preset scrambling code or spreading code. If decoding can be performed normally, it indicates that the currently received signaling is handover signaling, and handover is executed. If decoding cannot be performed normally, it indicates that the currently received signaling is not handover signaling.

Step 304: Send the handover signaling to the physical layer of the mobile terminal, so that the mobile terminal executes handover according to the handover signaling.

Step 305: Send a first handover indication of the mobile terminal to a first media access control layer, where the first handover indication is used for reporting handover of the mobile terminal.

Step 306: Send the first handover indication of the mobile terminal to a first radio resource control layer by using the first media access control layer.

Step 307: Receive handover completion response information sent by the physical layer of the mobile terminal.

Step 305, step 306 and step 307 are optional execution steps, and do not affect implementation of handover, and step 305 and step 306 may be performed before step 304, or may be performed after step 307.

Embodiment 4

Figure 4:
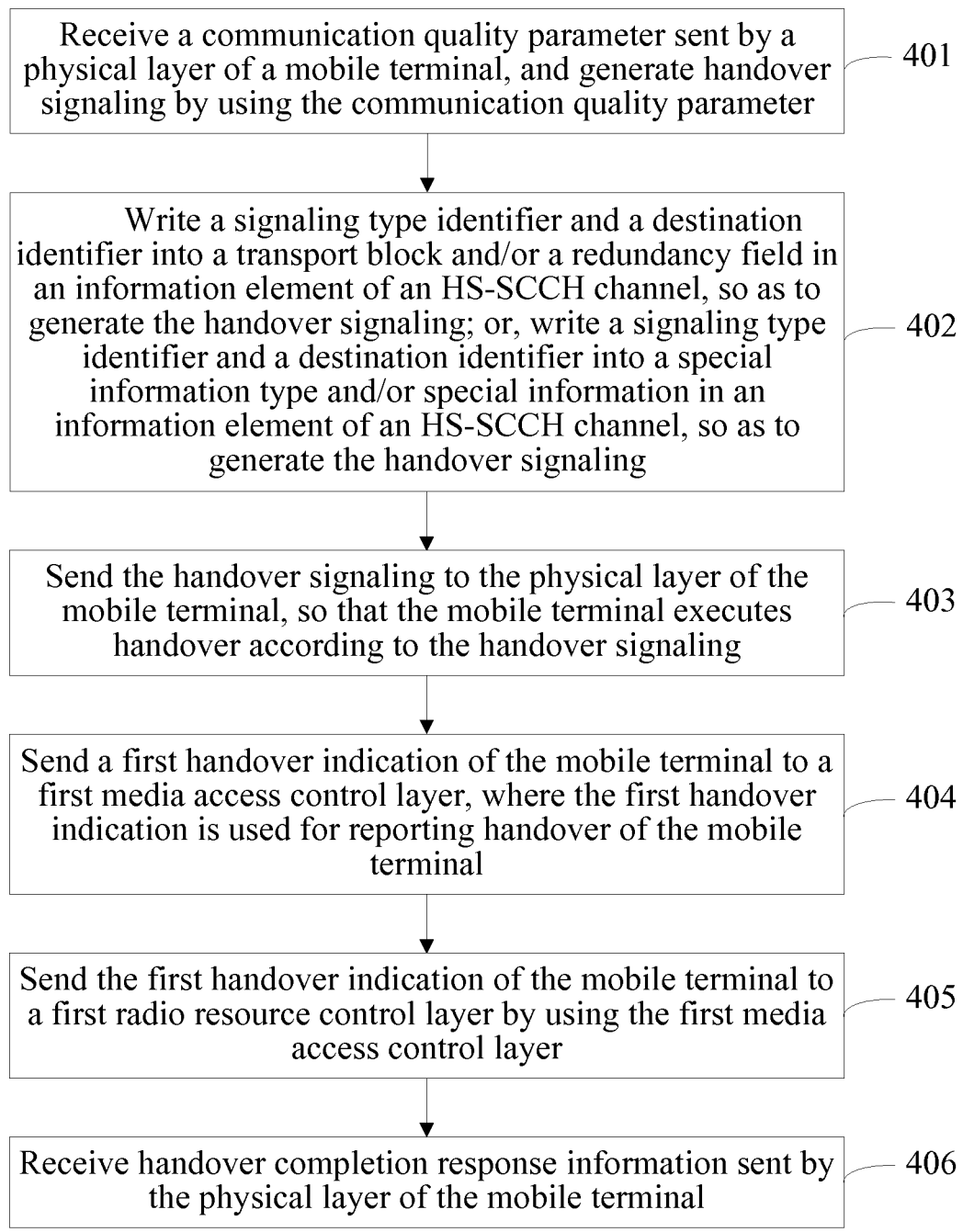
FIG. 4 is a flowchart of Embodiment 4 of a physical-layer-based handover method according to the present invention.

FIG. 4 is a flowchart of Embodiment 4 of a physical-layer-based handover method according to the present invention. Embodiment 4 is applied to a network side physical layer, and in a specific implementation manner, generated handover signaling is HS-SCCH signaling. Compared with Embodiment 3, received signaling is identified as handover signaling by using a signaling type identifier rather than scrambling or spectrum spreading manner. The method includes:

Step 401: Receive a communication quality parameter sent by a physical layer of a mobile terminal, and generate handover signaling by using the communication quality parameter.

This part is similar to Embodiment 2, and no further details are provided herein.

Step 402: Write a signaling type identifier and a destination identifier into a transport block and/or a redundancy field in an information element of an HS-SCCH channel, so as to generate the handover signaling;

or, write a signaling type identifier and a destination identifier into a special information type and/or special information in an information element of an HS-SCCH channel, so as to generate the handover signaling.

The HS-SCCH signaling has two formation manners:

The HS-SCCH signaling includes at least:

a spreading code (Channelization-code information), a transport block (Transport-block size information, TBS), a redundancy field (Redundancy and constellation version, RV), and a mobile terminal radio network temporary identity (UE identity RNTI (Radio Network Temporary Identity)).

In this case, the signaling type identifier and the destination identifier are written into the transport block and/or redundancy field in the information element of the HS-SCCH channel, so as to generate the handover signaling.

The HS-SCCH signaling includes at least:

a spreading code (Channelization-code information), a special information type (Special Information type, 6 bits): xtype,1, xtype,2, . . . , xtype,6, special information (Special Information, 7 bits): xinfo,1, xinfo,2, xinfo,3, xinfo,4, xinfo, 5, xinfo,6, xinfo,7, and a mobile terminal radio network temporary identity (UE identity RNTI (Radio Network Temporary Identity)).

In this case, the signaling type identifier and the destination identifier are written into the special information type and/or the special information in the information element of the HS-SCCH channel, so as to generate the handover signaling.

For example, the handover signaling may be set as follows:

The special information type: type,1, xtype,2, . . . , xtype, 6=111111, the special information: xinfo,1, xinfo,2, xinfo,3, xinfo,4, xinfo,5, xinfo,6, xinfo,7=1111111. The special information "111111" is used as the signaling type identifier, and used to indicate that the received signaling of the HS-SCCH channel is the handover signaling; the special information type "1111111" is used as the destination identifier, and is used to indicate a port number of a small cell to hand over to or an index corresponding to a pilot spreading code.

Setting of the handover signaling is not limited to the foregoing specific setting example, and there may also be other setting manners, which are not described herein one by one.

The mobile terminal executes handover according to the signaling type identifier and the destination identifier that are carried in the special information type and the special information to be handed over to a small cell indicated by the destination identifier.

Step 403: Send the handover signaling to the physical layer of the mobile terminal, so that the mobile terminal executes handover according to the handover signaling.

Step 404: Send a first handover indication of the mobile terminal to a first media access control layer, where the first handover indication is used for reporting handover of the mobile terminal.

Step 405: Send the first handover indication of the mobile terminal to a first radio resource control layer by using the first media access control layer.

Step 406: Receive handover completion response information sent by the physical layer of the mobile terminal.

Step 404, step 405 and step 406 are optional execution steps, and do not affect implementation of handover, and step 404 and step 405 may be performed before step 403, or may be performed after step 406.

Embodiment 5

Figure 5:
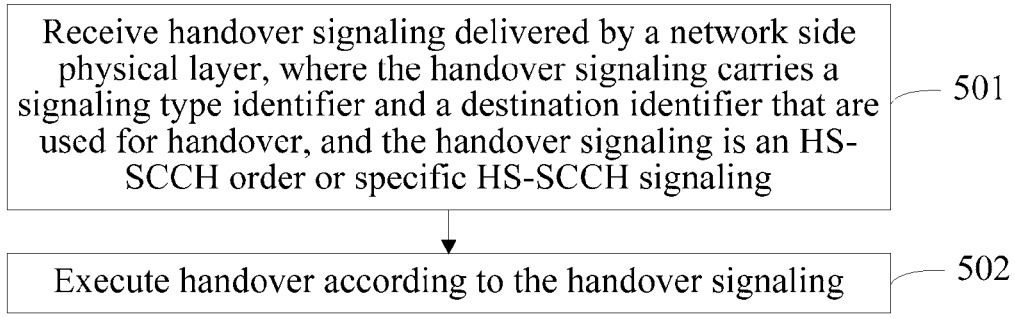
FIG. 5 is a flowchart of Embodiment 5 of a physical-layer-based handover method according to the present invention.

FIG. 5 is a flowchart of Embodiment 5 of a physical-layer-based handover method according to the present invention. The method provided in Embodiment 5 is applied to a mobile terminal physical layer, and includes the following steps:

Step 501: Receive handover signaling delivered by a network side physical layer, where the handover signaling carries a signaling type identifier and a destination identifier that are used for handover, and the handover signaling is an HS-SCCH order or specific HS-SCCH signaling.

During a moving process of the mobile terminal, communication quality is detected, and a communication quality parameter is sent to the network side physical layer, so that the network side physical layer generates handover signaling and delivers the handover signaling to the mobile terminal. In Embodiment 1, that the network side physical layer generates handover signaling has been described in detail, and no further details are provided herein.

Step 502: Execute handover according to the handover signaling.

After receiving the signaling, the mobile terminal identifies whether the received signaling is handover signaling according to the signaling type identifier, and if yes, executes handover according to the destination identifier carried in the handover signaling to be handed over to a small cell indicated by the destination identifier.

Embodiment 6

Figure 6:
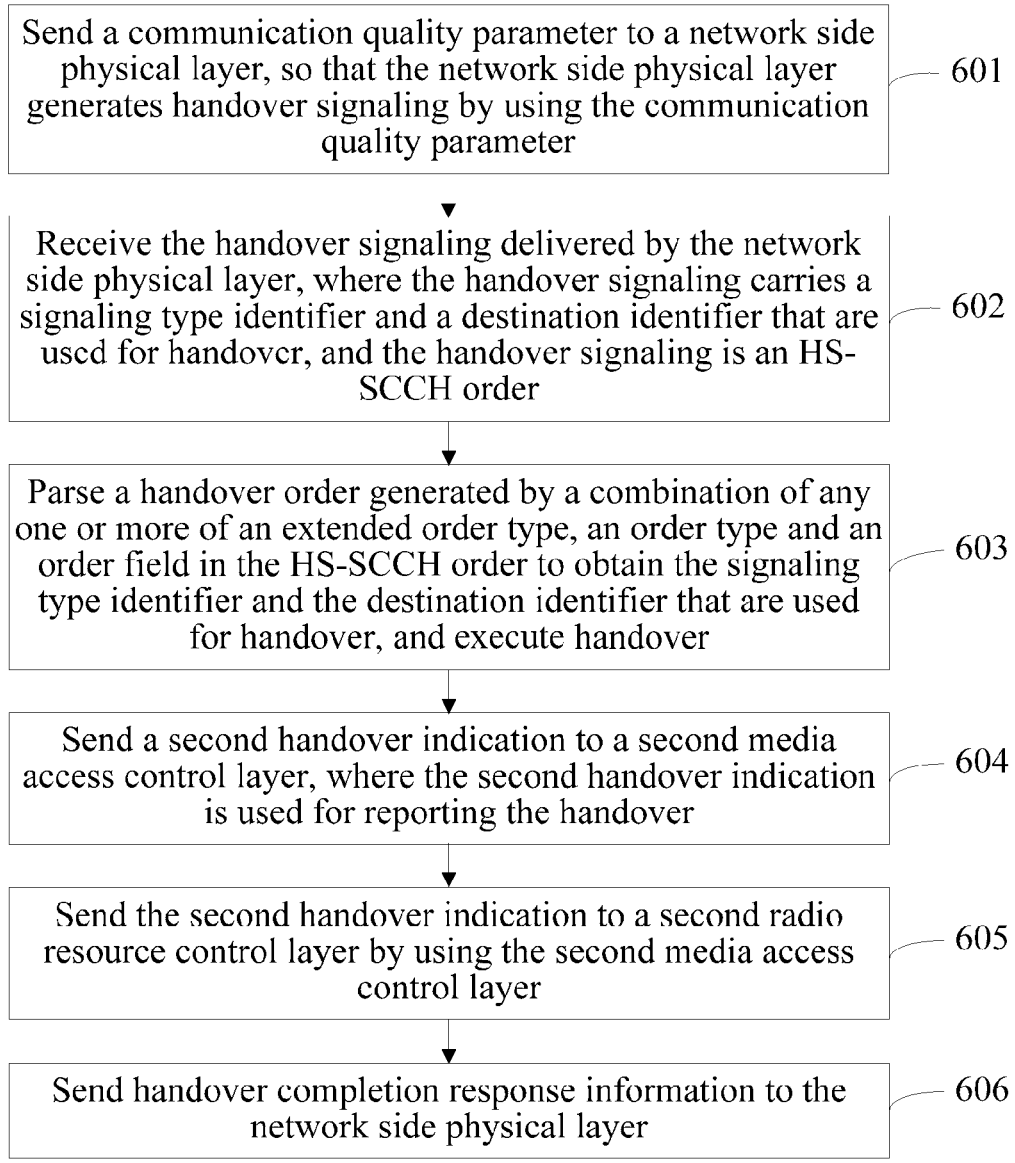
FIG. 6 is a flowchart of Embodiment 6 of a physical-layer-based handover method according to the present invention.

FIG. 6 is a flowchart of Embodiment 6 of a physical-layer-based handover method according to the present invention. The method provided in Embodiment 6 is applied to a mobile terminal physical layer, and in a specific implementation manner, received handover signaling is an HS-SCCH order. The method includes the following steps:

Step 601: Send a communication quality parameter to a network side physical layer, so that the network side physical layer generates handover signaling by using the communication quality parameter.

This part is similar to Embodiment 2, and no further details are provided herein.

Step 602: Receive the handover signaling delivered by the network side physical layer, where the handover signaling carries a signaling type identifier and a destination identifier that are used for handover, and the handover signaling is an HS-SCCH order.

Step 603: Parse a handover order generated from a combination of any one or more of an extended order type, an order type and an order field in the HS-SCCH order to obtain the signaling type identifier and the destination identifier that are used for handover, and execute handover.

The HS-SCCH order has been described in detail in Embodiment 2, and no further details are provided herein. The physical layer of the mobile terminal receives the HS-SCCH order, and identifies a received order as a handover order according to the parsed-out signaling type identifier, and hands over the terminal, according to the parsed-out destination identifier, to a small cell indicated by the destination identifier.

Step 604: Send a second handover indication to a second media access control layer, where the second handover indication is used for reporting the handover.

The physical layer of the mobile terminal sends the second handover indication of the mobile terminal to the second media access control layer. The second media access control layer is a media access control (MAC) layer of the mobile terminal. The second handover indication may include the destination identifier and is used for reporting handover of the mobile terminal, so that the MAC of the mobile terminal records the small cell to which the mobile terminal is handed over.

Step 605: Send the second handover indication to a second radio resource control layer by using the second media access control layer.

The second radio resource control layer is a radio resource control layer of the mobile terminal, the physical layer of the mobile terminal may also report the second handover indication of the mobile terminal to the RRC layer of the mobile terminal by using the MAC of the mobile terminal, so that the RRC of the mobile terminal performs resource management.

Step 606: Send handover completion response information to the network side physical layer.

When the mobile terminal completes execution of the handover, the mobile terminal sends the handover completion response information to the network side physical layer to notify the network side physical layer of handover completion.

Step 604, step 605 and step 606 are optional execution steps, and do not affect implementation of handover, and step 604 and step 605 may also be performed after step 606.

Embodiment 7

Figure 7:
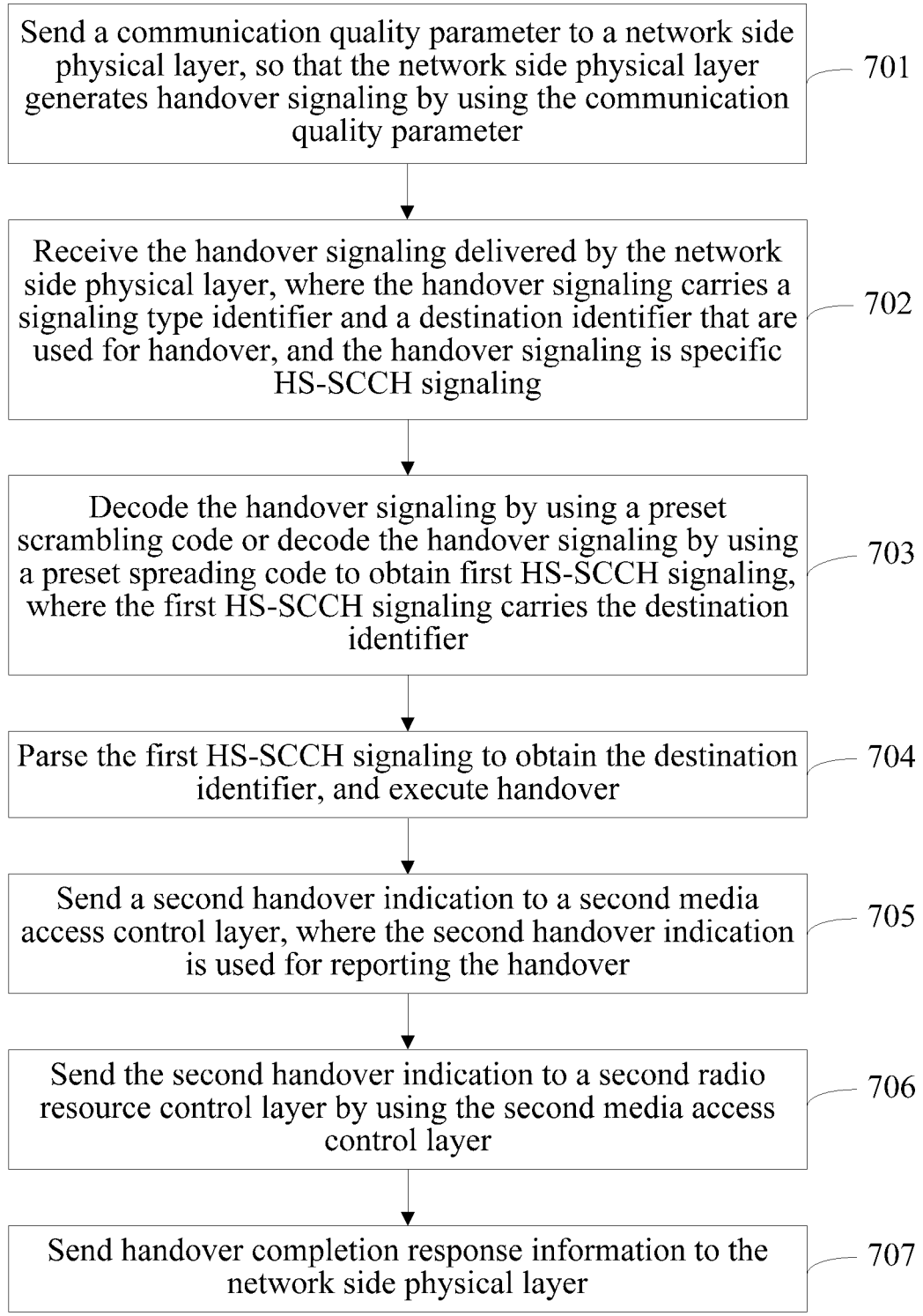
FIG. 7 is a flowchart of Embodiment 7 of a physical-layer-based handover method according to the present invention.

FIG. 7 is a flowchart of Embodiment 7 of a physical-layer-based handover method according to the present invention. The method provided in Embodiment 7 is applied to a mobile terminal physical layer, and in a specific implementation manner, received handover signaling is HS-SCCH signaling. The method includes the following steps:

Step 701: Send a communication quality parameter to a network side physical layer, so that the network side physical layer generates handover signaling by using the communication quality parameter.

Step 702: Receive the handover signaling delivered by the network side physical layer, where the handover signaling carries a signaling type identifier and a destination identifier that are used for handover, and the handover signaling is specific HS-SCCH signaling.

Step 703: Decode the handover signaling by using a preset scrambling code or decode the handover signaling by using a preset spreading code to obtain first HS-SCCH signaling, where the first HS-SCCH signaling carries the destination identifier.

The preset scrambling code or spreading code includes:

a received scrambling code or spreading code that is sent by the network side by using a system broadcast or RRC message before handover;

or, a fixed scrambling code or spreading code agreed on in advance with the network side.

The preset scrambling code or spreading code is used as an information type identifier. If the received signaling can be decoded normally by the preset scrambling code or spreading code, the received signaling is handover signaling; and if the received signaling cannot be decoded normally by the preset scrambling code or spreading code, the received signaling is not the handover signaling.

The handover signaling is decoded by the preset scrambling code or the handover signaling is decoded by the preset spreading code to obtain the first HS-SCCH signaling. A manner for generating the first HS-SCCH signaling includes:

writing the destination identifier into a transport block and/or a redundancy field in an information element of an HS-SCCH channel, so as to generate the first HS-SCCH signaling;

or, writing the destination identifier into a special information type and/or special information of the HS-SCCH signaling, so as to generate the first HS-SCCH signaling.

Therefore, the first HS-SCCH signaling carries the destination identifier.

Step 704: Parse the first HS-SCCH signaling to obtain the destination identifier, and execute handover.

Corresponding to the manner for generating the first HS-SCCH signaling, there are two implementation manners:

A first implementation manner is:

when the first HS-SCCH signaling includes a transport block and a redundancy field, parsing the transport block and/or redundancy field in the first HS-SCCH signaling to obtain the destination identifier, and executing handover.

A second implementation manner is:

when the first HS-SCCH signaling includes a special information type and special information, parsing the special information type and/or special information in the first HS-SCCH signaling to obtain the destination identifier, and executing handover.

The mobile terminal is handed over, according to the destination identifier, to a small cell indicated by the destination identifier.

Step 705: Send a second handover indication to a second media access control layer, where the second handover indication is used for reporting the handover.

Step 706: Send the second handover indication to a second radio resource control layer by using the second media access control layer.

Step 707: Send handover completion response information to the network side physical layer.

Step 705, step 706 and step 707 are optional execution steps, and do not affect implementation of handover, and step 705 and step 707 may also be performed after step 707.

Embodiment 8

Figure 8:
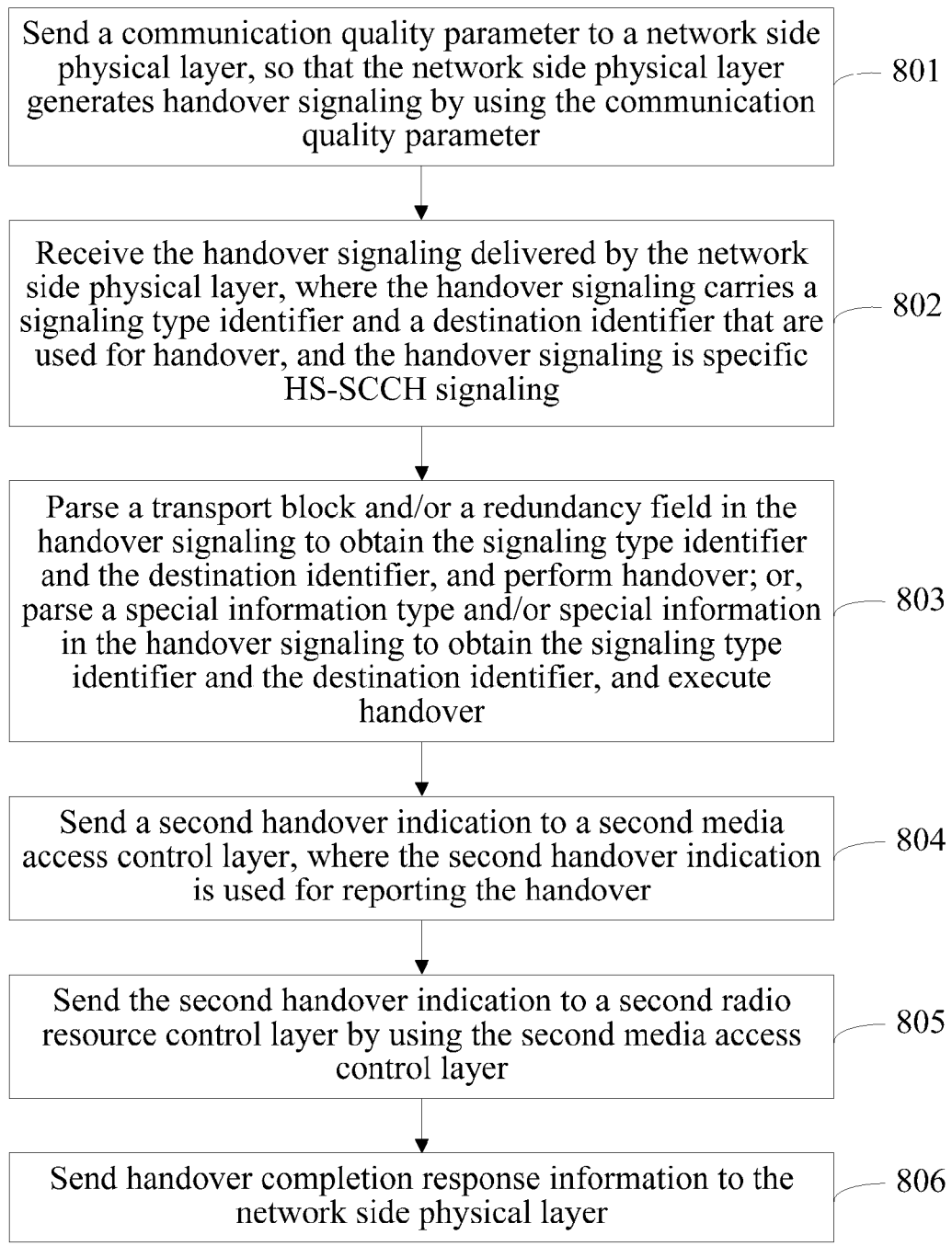
FIG. 8 is a flowchart of Embodiment 8 of a physical-layer-based handover method according to the present invention.

FIG. 8 is a flowchart of Embodiment 8 of a physical-layer-based handover method according to the present invention. The method provided in Embodiment 8 is applied to a mobile terminal physical layer, and in a specific implementation manner, received handover signaling is HS-SCCH signaling. Compared with Embodiment 8, handover signaling is identified by using a signaling type identifier rather than by decoding scrambled or spread signaling. The method includes the following steps:

Step 801: Send a communication quality parameter to a network side physical layer, so that the network side physical layer generates handover signaling by using the communication quality parameter.

Step 802: Receive the handover signaling delivered by the network side physical layer, where the handover signaling carries a signaling type identifier and a destination identifier that are used for handover, and the handover signaling is specific HS-SCCH signaling.

Step 803: Parse a transport block and/or a redundancy field in the handover signaling to obtain the signaling type identifier and the destination identifier, and execute handover;

or, parse a special information type and/or special information in the handover signaling to obtain the signaling type identifier and the destination identifier, and execute handover.

When the first HS-SCCH signaling includes a transport block and a redundancy field, the transport block and/or redundancy field in the handover signaling is parsed to obtain the signaling type identifier and the destination identifier, and handover is executed.

When the first HS-SCCH signaling includes a special information type and special information, the special information type and/or special information in the handover signaling is parsed to obtain the signaling type identifier and the destination identifier, and handover is executed.

The mobile terminal identifies that the received signaling is handover signaling according to the parsed-out signaling type identifier and executes handover to be handed over to a small cell indicated by the parsed-out destination identifier.

Step 804: Send a second handover indication to a second media access control layer, where the second handover indication is used for reporting the handover.

Step 805: Send the second handover indication to a second radio resource control layer by using the second media access control layer.

Step 806: Send handover completion response information to the network side physical layer.

Step 804, step 805 and step 806 are optional execution steps, and do not affect implementation of handover, and step 804 and step 805 may also be performed after step 805.

Embodiment 9

Figure 9:
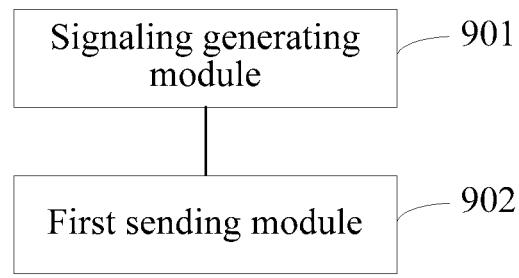
FIG. 9 is a schematic structural diagram of Embodiment 9 of a handover apparatus for a network side physical layer according to the present invention.

FIG. 9 is a schematic structural diagram of Embodiment 9 of a handover apparatus for a network side physical layer according to the present invention. The apparatus provided in Embodiment 9 corresponds to the method provided in Embodiment 1. The apparatus includes: a signaling generating module 901 and a first sending module 902.

The signaling generating module 901 is configured to generate handover signaling, where the handover signaling carries a signaling type identifier and a destination identifier that are used for handover, and the handover signaling is an HS-SCCH order or specific HS-SCCH signaling.

The first sending module 902 is configured to send the handover signaling to a physical layer of a mobile terminal, so that the mobile terminal executes handover according to the handover signaling.

Embodiment 10

Figure 10:
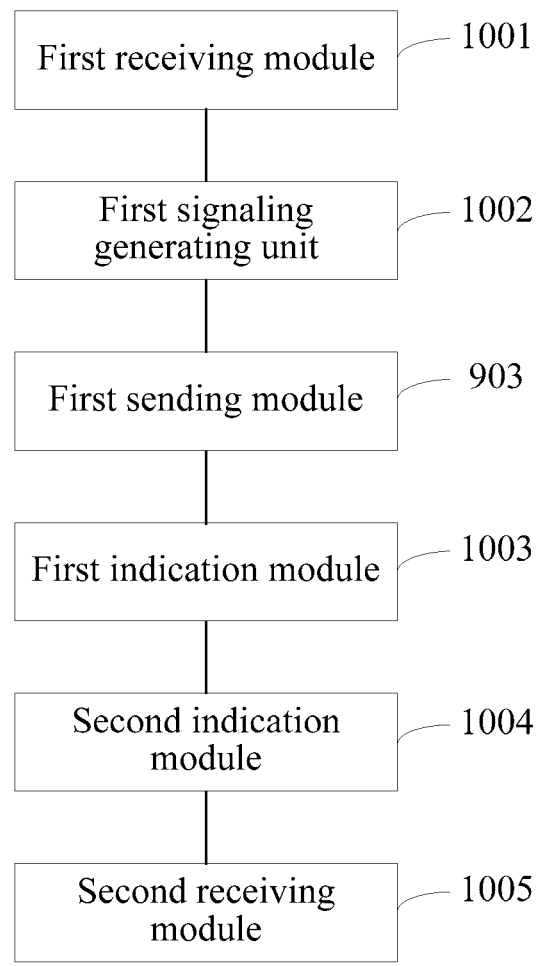
FIG. 10 is a schematic structural diagram of Embodiment 10 of a handover apparatus for a network side physical layer according to the present invention.

FIG. 10 is a schematic structural diagram of Embodiment 10 of a handover apparatus for a network side physical layer according to the present invention. The apparatus provided in Embodiment 10 corresponds to the method provided in Embodiment 2. The apparatus includes: a first receiving module 1001, a first signaling generating unit 1002, a first sending module 903, a first indication module 1003, a second indication module 1004, and a second receiving module 1005.

The first receiving module 1001 is configured to receive a communication quality parameter sent by a physical layer of a mobile terminal, and generate handover signaling by using the communication quality parameter.

The first signaling generating unit 1002 is configured to write the signaling type identifier and the destination identifier that are used for handover into a combination of any one or more of an extended order type, an order type and an order field in the HS-SCCH order, so as to generate the handover signaling.

The first sending module 903 is configured to send the handover signaling to the physical layer of the mobile terminal, so that the mobile terminal executes handover according to the handover signaling.

The first indication module 1003 is configured to send a first handover indication of the mobile terminal to a first media access control layer, where the first handover indication is used for reporting handover of the mobile terminal.

The second indication module 1004 is configured to send the first handover indication of the mobile terminal to a first radio resource control layer by using the first media access control layer.

The second receiving module 1005 is configured to receive handover completion response information sent by the physical layer of the mobile terminal.

The first indication module 1003, the second indication module 1004 and the second receiving module 1005 are optional, and do not affect implementation of handover.

Embodiment 11

Figure 11:
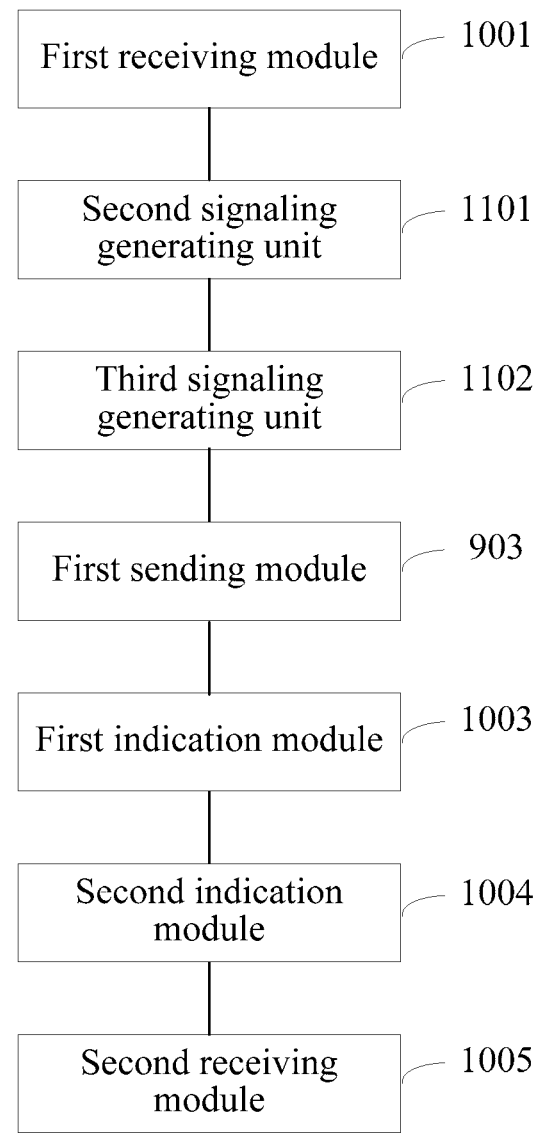
FIG. 11 is a schematic structural diagram of Embodiment 11 of a handover apparatus for a network side physical layer according to the present invention.

FIG. 11 is a schematic structural diagram of Embodiment 11 of a handover apparatus for a network side physical layer according to the present invention. The apparatus provided in Embodiment 11 corresponds to the method provided in Embodiment 3. The apparatus includes: a first receiving module 1001, a second signaling generating unit 1101, a third signaling generating unit 1102, a first sending module 903, a first indication module 1003, a second indication module 1004, and a second receiving module 1005.

The first receiving module 1001 is configured to receive a communication quality parameter sent by a physical layer of a mobile terminal, and generate handover signaling by using the communication quality parameter.

The second signaling generating unit 1101 is configured to generate first HS-SCCH signaling, where the first HS-SCCH signaling carries a destination identifier.

The second signaling generating unit 1101 includes:

a first writing subunit, configured to write the destination identifier into a transport block and/or a redundancy field in an information element of an HS-SCCH channel, so as to generate the first HS-SCCH signaling;

or, a second writing subunit, configured to write the destination identifier into a writing special information type and/or special information in an information element of an HS-SCCH channel, so as to generate the first HS-SCCH signaling.

The third signaling generating unit 1102 is configured to scramble the first HS-SCCH signaling by using a preset scrambling code or spread spectrum of the first HS-SCCH signaling by using a preset spreading code, so as to generate the handover signaling.

The first sending module 903 is configured to send the handover signaling to the physical layer of the mobile terminal, so that the mobile terminal executes handover according to the handover signaling.

The first indication module 1003 is configured to send a first handover indication of the mobile terminal to a first media access control layer, where the first handover indication is used for reporting handover of the mobile terminal.

The second indication module 1004 is configured to send the first handover indication of the mobile terminal to a first radio resource control layer by using the first media access control layer.

The second receiving module 1005 is configured to receive handover completion response information sent by the physical layer of the mobile terminal.

Embodiment 12

Figure 12:
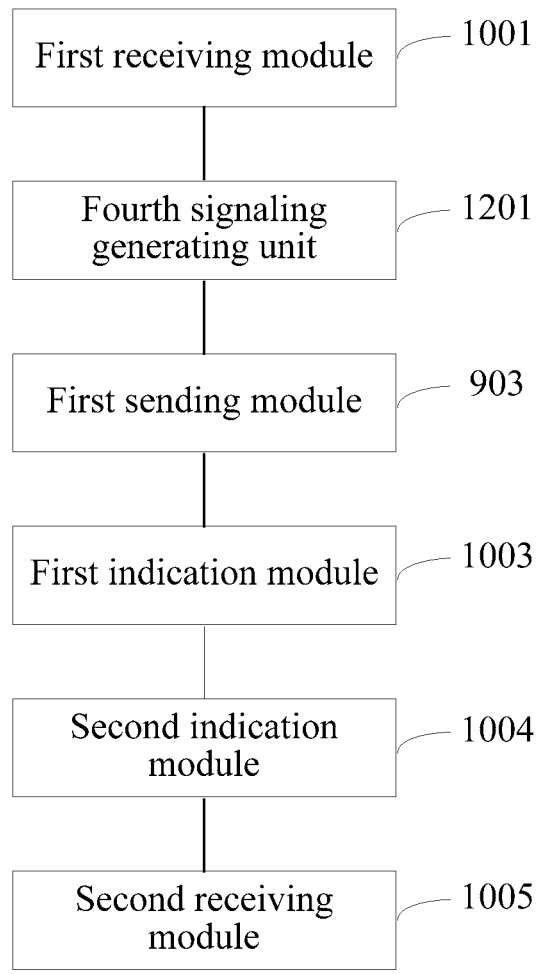
FIG. 12 is a schematic structural diagram of Embodiment 12 of a handover apparatus for a network side physical layer according to the present invention.

FIG. 12 is a schematic structural diagram of Embodiment 12 of a handover apparatus for a network side physical layer according to the present invention. The apparatus provided in Embodiment 12 corresponds to the method provided in Embodiment 4. The apparatus includes: a first receiving module 1001, a fourth signaling generating unit 1201, a first sending module 903, a first indication module 1003, a second indication module 1004, and a second receiving module 1005.

The first receiving module 1001 is configured to receive a communication quality parameter sent by a physical layer of a mobile terminal, and generate handover signaling by using the communication quality parameter.

The fourth signaling generating unit 1201 is configured to write a signaling type identifier and a destination identifier into a transport block and/or a redundancy field in an information element of an HS-SCCH channel, so as to generate the handover signaling;

or, configured to write a signaling type identifier and a destination identifier into a special information type and/or special information in an information element of an HS-SCCH channel, so as to generate the handover signaling.

The first sending module 903 is configured to send the handover signaling to the physical layer of the mobile terminal, so that the mobile terminal executes handover according to the handover signaling.

The first indication module 1003 is configured to send a first handover indication of the mobile terminal to a first media access control layer, where the first handover indication is used for reporting handover of the mobile terminal.

The second indication module 1004 is configured to send the first handover indication of the mobile terminal to a first radio resource control layer by using the first media access control layer.

The second receiving module 1005 is configured to receive handover completion response information sent by the physical layer of the mobile terminal.

Embodiment 13

Figure 13:
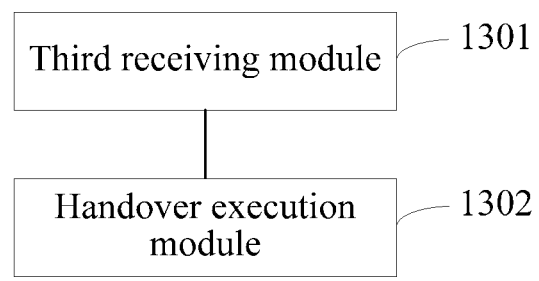
FIG. 13 is a schematic structural diagram of Embodiment 13 of a handover apparatus for a mobile terminal physical layer according to the present invention.

FIG. 13 is a schematic structural diagram of Embodiment 13 of a handover apparatus for a mobile terminal physical layer according to the present invention. The apparatus provided in Embodiment 13 corresponds to the method provided in Embodiment 5. The apparatus includes: a third receiving module 1301 and a handover execution module 1302.

The third receiving module 1301 is configured to receive handover signaling delivered by a network side physical layer, where the handover signaling carries a signaling type identifier and a destination identifier that are used for handover, and the handover signaling is an HS-SCCH order or specific HS-SCCH signaling.

The handover execution module 1302 is configured to execute handover according to the handover signaling.

Embodiment 14

Figure 14:
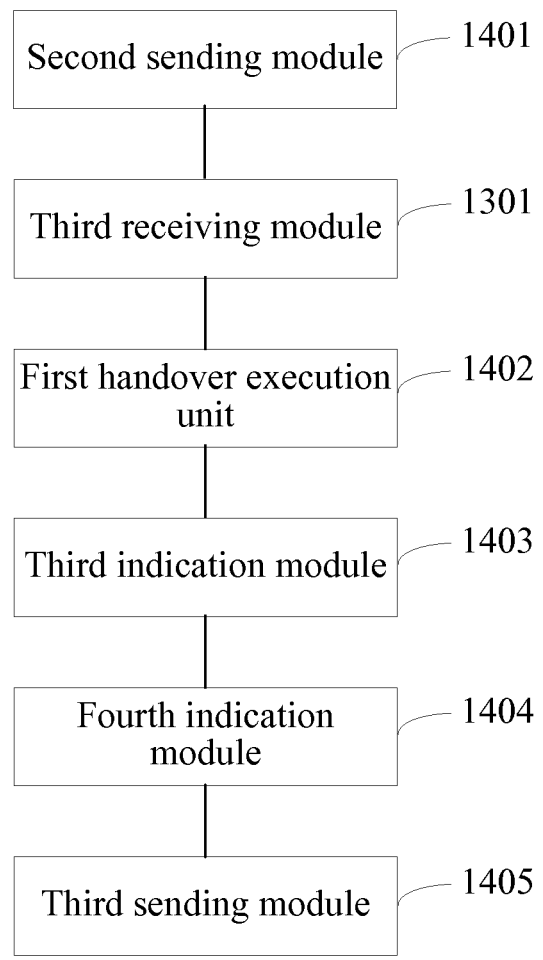
FIG. 14 is a schematic structural diagram of Embodiment 14 of a handover apparatus for a mobile terminal physical layer according to the present invention.

FIG. 14 is a schematic structural diagram of Embodiment 14 of a handover apparatus for a mobile terminal physical layer according to the present invention. The apparatus provided in Embodiment 14 corresponds to the method provided in Embodiment 6. The apparatus includes: a second sending module 1401, a third receiving module 1301, a first handover execution unit 1402, a third indication module 1403, a fourth indication module 1404, and a third sending module 1405.

The second sending module 1401 is configured to send a communication quality parameter to a network side physical layer, so that the network side physical layer generates handover signaling by using the communication quality parameter.

The third receiving module 1301 is configured to receive the handover signaling delivered by the network side physical layer, where the handover signaling carries a signaling type identifier and a destination identifier that are used for handover, and the handover signaling is an HS-SCCH order.

The first handover execution unit 1402 is configured to parse a handover order generated from a combination of any one or more of an extended order type, an order type and an order field in the HS-SCCH order to obtain the signaling type identifier and the destination identifier that are used for handover, and execute handover.

The third indication module 1403 is configured to send a second handover indication to a second media access control layer, where the second handover indication is used for reporting the handover.

The fourth indication module 1404 is configured to send the second handover indication to a second radio resource control layer by using the second media access control layer.

The third sending module 1405 is configured to send handover completion response information to the network side physical layer.

The third indication module 1403, the fourth indication module 1404 and the third sending module 1405 are optional, and do not affect implementation of handover.

Embodiment 15

Figure 15:
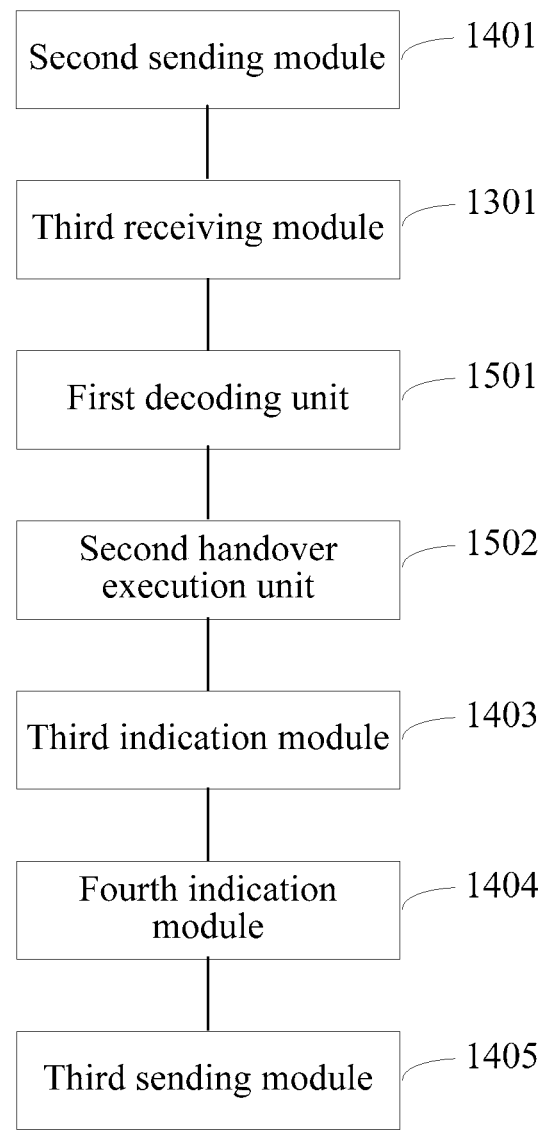
FIG. 15 is a schematic structural diagram of Embodiment 15 of a handover apparatus for a mobile terminal physical layer according to the present invention.

FIG. 15 is a schematic structural diagram of Embodiment 15 of a handover apparatus for a mobile terminal physical layer according to the present invention. The apparatus provided in Embodiment 15 corresponds to the method provided in Embodiment 7. The apparatus includes: a second sending module 1401, a third receiving module 1301, a first decoding unit 1501, a second handover execution unit 1502, a third indication module 1403, a fourth indication module 1404, and a third sending module 1405.

The second sending module 1401 is configured to send a communication quality parameter to a network side physical layer, so that the network side physical layer generates handover signaling by using the communication quality parameter.

The third receiving module 1301 is configured to receive the handover signaling delivered by the network side physical layer, where the handover signaling carries a signaling type identifier and a destination identifier that are used for handover, and the handover signaling is specific HS-SCCH signaling.

The first decoding unit 1501 is configured to decode the handover signaling by using a preset scrambling code or decode the handover signaling by using a preset spreading code to obtain first HS-SCCH signaling, where the first HS-SCCH signaling carries the destination identifier.

The second handover execution unit 1502 is configured to parse the first HS-SCCH signaling to obtain the destination identifier, and execute handover.

The second handover execution unit 1502 includes:

a first handover execution subunit, configured to parse a transport block and/or a redundancy field in the first HS-SCCH signaling to obtain the destination identifier, and execute handover;

or, a second handover execution subunit, configured to parse a special information type and/or special information in the first HS-SCCH signaling to obtain the destination identifier, and execute handover.

The third indication module 1403 is configured to send a second handover indication to a second media access control layer, where the second handover indication is used for reporting the handover.

The fourth indication module 1404 is configured to send the second handover indication to a second radio resource control layer by using the second media access control layer.

The third sending module 1405 is configured to send handover completion response information to the network side physical layer.

Embodiment 16

Figure 16:
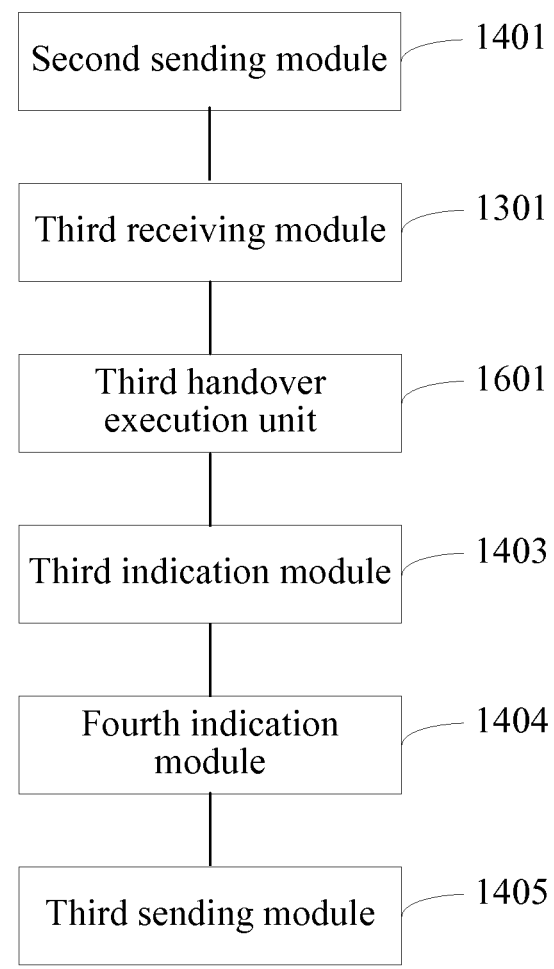
FIG. 16 is a schematic structural diagram of Embodiment 16 of a handover apparatus for a mobile terminal physical layer according to the present invention.

FIG. 16 is a schematic structural diagram of Embodiment 16 of a handover apparatus for a mobile terminal physical layer according to the present invention. The apparatus provided in Embodiment 16 corresponds to the method provided in Embodiment 8. The apparatus includes: a second sending module 1401, a third receiving module 1301, a third handover execution unit 1601, a third indication module 1403, a fourth indication module 1404, and a third sending module 1405.

The second sending module 1401 is configured to send a communication quality parameter to a network side physical layer, so that the network side physical layer generates handover signaling by using the communication quality parameter.

The third receiving module 1301 is configured to receive the handover signaling delivered by the network side physical layer, where the handover signaling carries a signaling type identifier and a destination identifier that are used for handover, and the handover signaling is an HS-SCCH order or specific HS-SCCH signaling.

The third handover execution unit 1601 is configured to parse a transport block and/or a redundancy field in the handover signaling to obtain the signaling type identifier and the destination identifier, and execute handover;

or, configured to parse a special information type and/or special information in the handover signaling to obtain the signaling type identifier and the destination identifier, and execute handover.

The third indication module 1403 is configured to send a second handover indication to a second media access control layer, where the second handover indication is used for reporting the handover.

The fourth indication module 1404 is configured to send the second handover indication to a second radio resource control layer by using the second media access control layer.

The third sending module 1405 is configured to send handover completion response information to the network side physical layer.

Embodiment 17

The present invention provides a handover system. The system includes the handover apparatus for a network side physical layer according to any one of Embodiment 9 to Embodiment 12 of the present invention, and the handover apparatus for a mobile terminal physical layer according to any one of Embodiment 13 to Embodiment 16 of the present invention.

Embodiment 18

The present invention provides Embodiment 18 of a physical-layer-based handover apparatus, which is applied to a network side physical layer. The apparatus includes a first memory and a first processor. The first memory is configured to store an instruction, and the first processor is configured to invoke the instruction. The instruction includes:

generating handover signaling, where the handover signaling carries a signaling type identifier and a destination identifier that are used for handover, and the handover signaling is an HS-SCCH order or specific HS-SCCH signaling.

Optionally, when the handover signaling is an HS-SCCH order, the instruction of generating the handover signaling includes:

writing the signaling type identifier and the destination identifier that are used for handover into a combination of any one or more of an extended order type, an order type and an order field in the HS-SCCH order, so as to generate the handover signaling.

Optionally, when the handover signaling is specific HS-SCCH signaling, the instruction of generating the handover signaling includes:

generating first HS-SCCH signaling, where the first HS-SCCH signaling carries the destination identifier.

Optionally, the instruction of generating the handover signaling includes:

writing the destination identifier into a transport block and/or a redundancy field in an information element of an HS-SCCH channel, so as to generate the first HS-SCCH signaling;

or, writing the destination identifier into a writing special information type and/or special information in an information element of an HS-SCCH channel, so as to generate the first HS-SCCH signaling.

The first HS-SCCH signaling is scrambled by using a preset scrambling code or spectrum of the first HS-SCCH signaling is spread by using a preset spreading code, so as to generate the handover signaling.

Optionally, when the handover signaling is specific HS-SCCH signaling, the instruction of generating the handover signaling includes:

writing the signaling type identifier and the destination identifier into a transport block and/or a redundancy field in an information element of an HS-SCCH channel, so as to generate the handover signaling;

or, writing the signaling type identifier and the destination identifier into a special information type and/or special information in an information element of an HS-SCCH channel, so as to generate the handover signaling.

The handover signaling is sent to a physical layer of a mobile terminal, so that the mobile terminal executes handover according to the handover signaling.

Optionally, the instruction further includes:

receiving a communication quality parameter sent by the physical layer of the mobile terminal, and generating the handover signaling by using the communication quality parameter. Optionally, the instruction further includes:

sending a first handover indication of the mobile terminal to a first media access control layer, where the first handover indication is used for reporting handover of the mobile terminal.

Optionally, the instruction further includes:

sending the first handover indication of the mobile terminal to a first radio resource control layer by using the first media access control layer.

Optionally, the instruction further includes:

receiving handover completion response information sent by the physical layer of the mobile terminal.

Embodiment 19

The present invention provides Embodiment 19 of a physical-layer-based handover apparatus, which is applied to a mobile terminal physical layer. The apparatus includes a second memory and a second processor. The second memory is configured to store an instruction, and the second processor is configured to invoke the instruction. The instruction includes:

receiving handover signaling delivered by a network side physical layer, where the handover signaling carries a signaling type identifier and a destination identifier that are used for handover, and the handover signaling is an HS-SCCH order or specific HS-SCCH signaling; and executing handover according to the handover signaling.

Optionally, when the handover signaling is an HS-SCCH order, the instruction of executing handover according to the handover signaling includes:

parsing a handover order generated from a combination of any one or more of an extended order type, an order type and an order field in the HS-SCCH order to obtain the signaling type identifier and the destination identifier that are used for handover, and executing handover.

Optionally, when the handover signaling is specific HS-SCCH signaling, the instruction of executing handover according to the handover signaling includes:

decoding the handover signaling by using a preset scrambling code or decoding the handover signaling by using a preset spreading code to obtain first HS-SCCH signaling, where the first HS-SCCH signaling carries the destination identifier; and parsing the first HS-SCCH signaling to obtain the destination identifier, and executing handover.

Optionally, the instruction of parsing the first HS-SCCH signaling to obtain the destination identifier, and executing handover includes:

parsing a transport block and/or a redundancy field in the first HS-SCCH signaling to obtain the destination identifier, and executing handover;

or, parsing a special information type and/or special information in the first HS-SCCH signaling to obtain the destination identifier, and executing handover.

Optionally, when the handover signaling is specific HS-SCCH signaling, the instruction of executing handover according to the handover signaling includes:

parsing a transport block and/or a redundancy field in the handover signaling to obtain the signaling type identifier and the destination identifier, and executing handover;

or, parsing a special information type and/or special information in the handover signaling to obtain the signaling type identifier and the destination identifier, and executing handover.

Optionally, the instruction further includes:

sending a communication quality parameter to the network side physical layer, so that the network side physical layer generates the handover signaling by using the communication quality parameter.

Optionally, the instruction further includes:

sending a second handover indication to a second media access control layer, where the second handover indication is used for reporting the handover.

Optionally, the instruction further includes:

sending the second handover indication to a second radio resource control layer by using the second media access control layer.

Optionally, the instruction further includes:

sending handover completion response information to the network side physical layer.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A physical-layer-based handover method for a network side physical layer, wherein the method comprises:

generating, by a network side device, handover signaling, wherein the handover signaling carries a signaling type identifier and a destination identifier, and wherein the handover signaling is a high-speed shared control channel (HS-SCCH) order or a specific HS-SCCH signaling; and sending, by the network side device, the handover signaling to a physical layer of a mobile terminal to facilitate execution of a handover according to the handover signaling by the mobile terminal.

2. The method according to claim 1, wherein the handover signaling is an HS-SCCH order, and wherein generating the handover signaling further comprises:

writing the signaling type identifier and the destination identifier into a combination of one or more of an extended order type field, an order type field and an order field in the HS-SCCH order, so as to generate the handover signaling.

3. The method according to claim 1, wherein the handover signaling is specific HS-SCCH signaling, and wherein generating the handover signaling further comprises:

generating first HS-SCCH signaling, wherein the first HS-SCCH signaling carries the destination identifier; and scrambling the first HS-SCCH signaling using a preset scrambling code or spreading a spectrum of the first HS-SCCH signaling using a preset spreading code, so as to generate the handover signaling.

4. The method according to claim 1, further comprising:

receiving a communication quality parameter from the physical layer of the mobile terminal;

wherein generating the handover signaling uses the communication quality parameter.

5. The method according to claim 1, further comprising:
sending a handover indication of the mobile terminal to a media access control layer, wherein the handover indication is used for reporting handover of the mobile terminal.

6. The method according to claim 5, further comprising:
sending the first handover indication of the mobile terminal to a radio resource control layer using the first media access control layer.

7. The method according to claim 1, further comprising:
receiving handover completion response information from the physical layer of the mobile terminal.

8. A physical-layer-based handover method for a mobile terminal physical layer, wherein the method comprises:
receiving, by a mobile terminal, handover signaling from a network side physical layer, wherein the handover signaling carries a signaling type identifier and a destination identifier, and wherein the handover signaling is a high-speed shared control channel (HS-SCCH) order or a specific HS-SCCH signaling; and
executing, by the mobile terminal, handover according to the handover signaling.

9. The method according to claim 8, further comprising:
sending a communication quality parameter to the network side physical layer to facilitate generation of the handover signaling by the network side physical layer using the communication quality parameter.

10. The method according to claim 9, wherein the communication quality parameter comprises: signal quality, received signal code power, a signal-to-noise ratio, a received signal strength indicator, and/or a channel quality indicator.

11. The method according to claim 9, wherein the communication quality parameter comprises: a pilot spreading code, a transmit port number, and/or an index corresponding to the pilot spreading code.

12. The method according to claim 8, further comprising:
sending a handover indication to a media access control layer, wherein the handover indication is used for reporting the handover.

13. The method according to claim 12, further comprising:
sending the handover indication to a radio resource control layer using the media access control layer.

14. The method according to claim 8, further comprising:
sending handover completion response information to the network side physical layer.

15. A non-transitory processor-readable medium having processor-executable instructions stored thereon for a network side physical layer, the processor-executable instructions when executed by a processor, facilitating performance of the following:
generating handover signaling, wherein the handover signaling carries a signaling type identifier and a destination identifier, and wherein the handover signaling is a high-speed shared control channel (HS-SCCH) order or a specific HS-SCCH signaling; and
sending the handover signaling to a physical layer of a mobile terminal to facilitate a handover according to the handover signaling by the mobile terminal.

16. The non-transitory processor-readable medium according to claim 15, wherein the handover signaling is an HS-SCCH order, and wherein generating the handover signaling further comprises:
writing the signaling type identifier and the destination identifier into a combination of one or more of an extended order type field, an order type field and an order field in the HS-SCCH order, so as to generate the handover signaling.

17. The non-transitory processor-readable medium according to claim 15, wherein the handover signaling is a specific HS-SCCH signaling, and wherein generating the handover signaling further comprises:
generating first HS-SCCH signaling, wherein the first HS-SCCH signaling carries the destination identifier; and
scrambling the first HS-SCCH signaling using a preset scrambling code or spreading a spectrum of the first HS-SCCH signaling using a preset spreading code, so as to generate the handover signaling.

18. The non-transitory processor-readable medium according to claim 15, wherein the instruction further comprises:
receiving a communication quality parameter sent by the physical layer of the mobile terminal, and generate the handover signaling by using the communication quality parameter.

19. The non-transitory processor-readable medium according to claim 15, wherein the processor-executable instructions, when executed, further facilitate performance of the following:
sending a handover indication of the mobile terminal to a media access control layer, wherein the first handover indication is used for reporting handover of the mobile terminal.

20. The non-transitory processor-readable medium according to claim 15, wherein the processor-executable instructions, when executed, further facilitate performance of the following:
receiving handover completion response information from the physical layer of the mobile terminal.

* * * * *